Patented Aug. 1, 1950

2,517,356

UNITED STATES PATENT OFFICE 2,517,356

SOLUTIONS OF POLYVINYL CHLORIDE IN A MIXTURE OF ACETONE AND PERCHLOROETHYLENE

Pierre Salé, La Demi-Lune, France, assignor to Societe Rhodiaceta, Paris, France, a French company No Drawing. Application March 17, 1949, Serial No. 82,004. In France December 23, 1948

4 Claims. (Cl. 260—32.8)

This invention relates to solutions of polyvinylchloride of high molecular weight and to a method of preparing such solutions.

It has been known that the solubility of vinylchloride polymers in organic solvents varies considerably according to the degree of their polymerization. Thus, polymers of low molecular weight are completely soluble in acetone, while polymers of high molecular weight do not dissolve in acetone even at boiling temperature and they do not dissolve in most of the other organic solvents either. This lack of solubility limits to a great extent the uses of vinylchloride polymers of high molecular weight, which, as known, are the most interesting technically.

The present invention is based on the discovery that the vinylchloride polymers of high molecular weight, i. e. products of such a degree of polymerization that they are not soluble in acetone at ordinary room temperature of, for example, 18°–25° C., dissolve at once at ordinary room temperature in mixtures of acetone and perchloroethylene ($C_2Cl_4$), which contain at least 30 volume-per cent and not more than 70 volume-per cent of acetone. This dissolving effect of such mixtures is the more unexpected and surprising as perchloroethylene by itself does not dissolve polyvinylchloride, even of low molecular weight, either in the cold or at boiling temperature.

The solutions obtained according to the present invention are colorless and stable and they may be heated for a long time to a temperature slightly above 100° C. without showing decomposition. They may be utilized for the most varied purposes, either as such or with the addition of diluents, such as particularly one of the constituents of the primary solution, i. e. acetone or perchloroethylene. Other diluents may likewise be used, such as for example, benzene, toluene, ethylacetate, butylacetate, or amylacetate, trichloroethylene, methylenechloride, carbondisulfide, etc.

In all of these operations, the procedure may be carried out not only at ordinary room temperature, but also in the heat, even under pressure at temperatures above the boiling point of one or more constituents of the mixed solvent.

Furthermore, plasticizing agents, pigments, loading agents, coloring agents, anti-depolishing agents, etc., may be added to the products of the invention, if desired. The solutions according to the present invention are of particular interest in connection with the preparation of threads, filaments, bristles, kemp, straw, varnishes, lacquers, foils, films, etc., by the usual methods utilized at present in the preparation of such products.

The following examples serve to illustrate the present invention without any limitation of the same.

*Example 1.*—100 kg. of a vinyl chloride polymer is used, which is insoluble in acetone at ordinary room temperature and has a molecular weight of 18,000. This molecular weight is calculated by using Staudinger's formula:

$$\frac{\text{visc. sp.}}{c} = Km.\, M$$

wherein "visc. sp." denotes the specific viscosity measured at 20° C. in a solution of 2 gr. per liter of the polymer, in a solvent consisting of equal volumes of acetone and carbon disulfide. "$Km$" is the constant of the solvent, equal to $2.7.10^{-4}$; $c$ is the concentration in grams per liter and $M$ denotes the degree of polymerization.

These 100 kgs. of the polymer are introduced into a mixer with 125 liters of perchloroethylene and 125 liters of acetone. After mixing, a very viscous, homogeneous solution is obtained, from which threads of polyvinyl chloride having a resistance of 2.8 g./denier may be obtained by dry spinning followed by drawing.

*Example 2.*—5 kg. of the same vinyl chloride polymer as used in Example 1 are introduced into a tight mixer together with 12 liters of perchoroethylene and 28 liters of acetone. After agitation at a temperature of 70° C., a viscous solution is obtained, to which 30 liters of acetone are gradually added. This solution may be utilized for the impregnation of fabrics of any kind, particularly of synthetic threads of polyvinylchloride in order to render the same impermeable and more stiff.

*Example 3.*—10 kg. of the same polyvinylchloride polymer as used in Example 1 are introduced into an autoclave provided with a stirrer, together with 28 liters of perchloroethylene and 12 liters of acetone. The autoclave is closed, the content is stirred and the temperature is slowly raised up to 100° C. A clear solution is quickly obtained which, after cooling, is very well suitable for varnishing, preparation of films which practically do not show the danger of inflammability.

As shown by the above examples, the concentration of the solutions embodying the present invention, as well as the proportions of the volatile liquid ingredients, and also the temperature and other conditions used in preparing the solutions may vary within wide limits and it will be understood that the invention is not limited to the specific details described in the examples.

What is claimed is:

1. Solutions of acetone-insoluble polyvinyl chloride in a mixture of acetone and perchloroethylene.

2. Solutions of acetone-insoluble polyvinyl chloride in a mixture of acetone and perchloroethylene, said mixture containing at least about 30 volume percent and not more than about 70 volume percent of acetone.

3. Solutions of acetone-insoluble polyvinyl chloride in a mixture of acetone and perchloroethylene, said mixture containing substantially equal volumes of perchloroethylene and acetone.

4. Solutions of acetone-insoluble polyvinyl chloride in a mixture of perchloroethylene, acetone and a diluent which is homogeneously miscible with the solution of polyvinyl chloride in said mixture of acetone and percholoroethylene.

PIERRE SALÉ.

REFERENCES CITED

The following references are of record in the file of this patent:

UNITED STATES PATENTS

| Number | Name | Date |
|---|---|---|
| 2,427,513 | Spessard | Sept. 16, 1947 |